3,157,615
ANTIOZONANTS AND ANTIOZONANT COMPOSITIONS FOR ELASTOMERS
Eldon E. Stahly, Birmingham, Mich., assignor, by direct and mesne assignments, of three-fourths to Oliver W. Burke, Jr., Grosse Pointe, Mich., and one-fourth to Eastman Kodak Company, Rochester, N.Y., a corporation of New Jersey
Filed Aug. 28, 1956, Ser. No. 606,767
5 Claims. (Cl. 260—45.9)

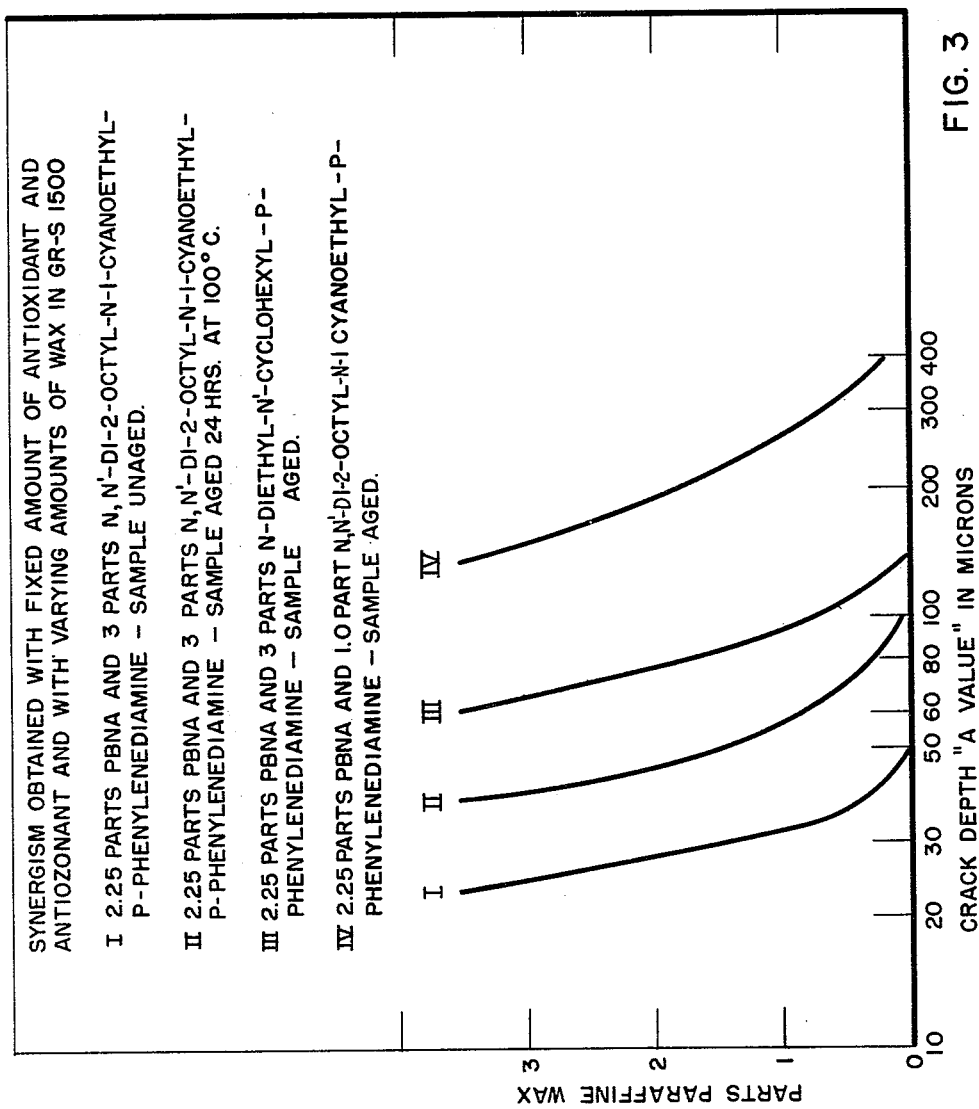

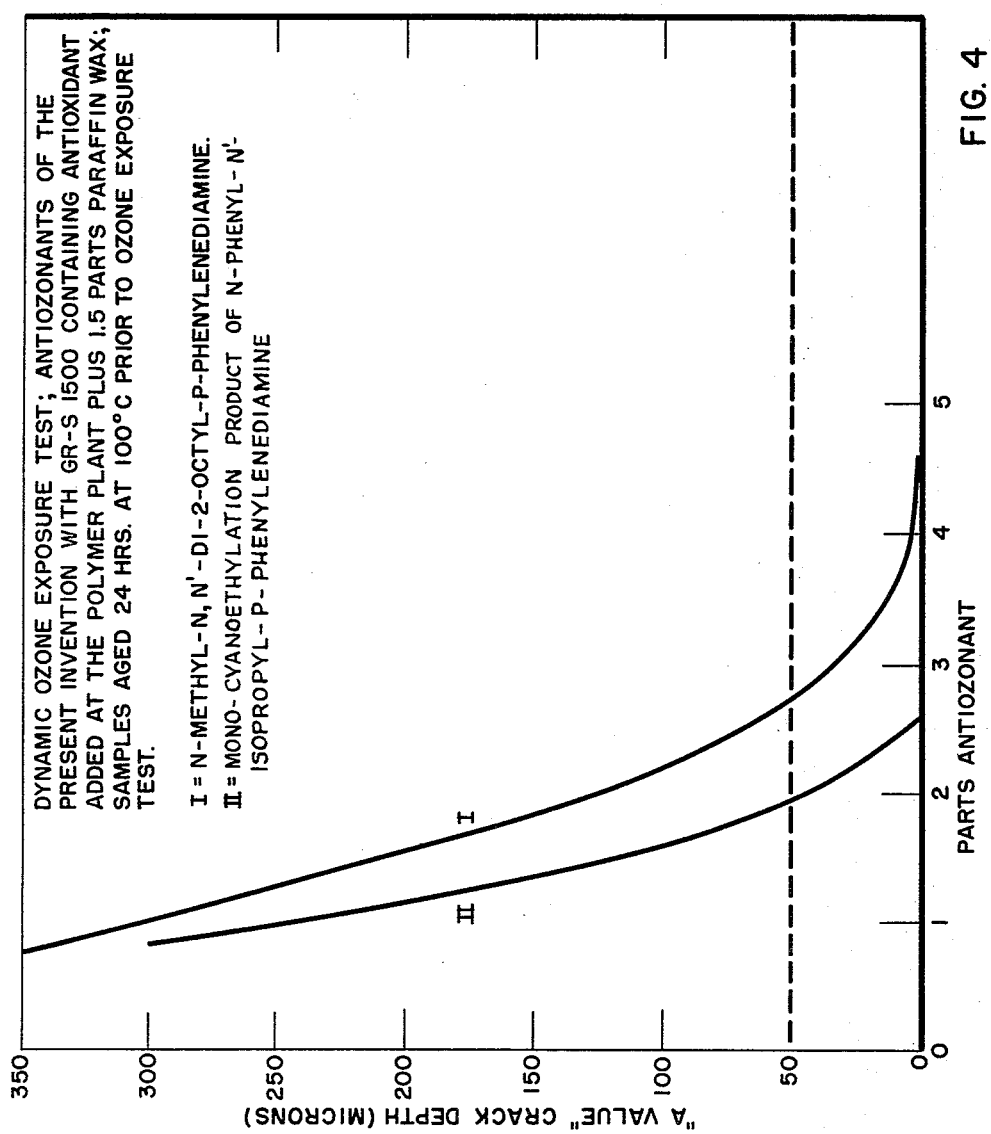

The invention disclosed herein relates to antiozonants for high polymers per se subject to ozone attack, especially vulcanizable elastomers including the natural rubbers, synthetic elastomers such as polybutadiene, GR-S type synthetic rubbers, other diene vinyl copolymers such as acrylonitrile-butadiene elastomers, etc., and in addition the non-vulcanizable elastomers, plastomers and resins, particularly those which have residual unsaturation, and aims generally to improve the same.

The present invention includes the class of substituted paraphenylenediamine antiozonants for elastomeric material set forth in Table A, synergistic antiozonant combinations thereof with either wax or antioxidant materials or with both, the incorporation of said antiozonants and synergistic combinations in elastomers, the improved products resulting therefrom, and the new chemical compounds herein disclosed.

The antiozonants of this invention also exhibit synergism with certain heavy metal soaps, a fact discovered jointly by applicant and R. G. Spain, and certain of the new antiozonants of the present invention have been disclosed in copending joint U.S. application, Ser. No. 523,711, filed July 22, 1955, for showing the synergism of that joint invention. However, such new antiozonants and combinations thereof with elastomers, per se, and in synergism with wax and/or antioxidant are not claimed in such joint application, since these matters are the sole invention of present applicant and claimed herein.

Similarly certain of the cyanohydrocarbon derivatives found by the present inventor to be effective antiozonants are, as chemical compounds disclosed and claimed in the U.S. application of applicant's co-worker, Rene G. Jennen, Ser. No. 556,423, now Patent No. 3,038,868, filed December 30, 1955, who first prepared them as part of a group of cyanoalkylamines for other uses, many of which per se are not antiozonants. Accordingly it is the discovery of the antiozonant characteristics of a particular class of such cyanohydrocarbon derivatives, some of which were chemical compounds available from Dr. Jennen, and not the available chemicals per se, that is claimed herein as the invention of the present applicant in connection with that part of the invention herein set forth in Table A, and the new chemical compounds herein disclosed, and set forth in Table B, exclude all compounds available from Dr. Jennen as well as from other sources.

While only the particular classes of the cyanoalkylamines set forth in Table A have been found to be effective antiozonants, per se, the cyanoalkylamines as a class do exhibit rubber antioxidant characteristics, and have been found by the present applicant to be effective synergists when combined with antiozonants of the present invention, and hence are referred to hereinafter as antioxidants employable for forming synergistic combinations of the present invention.

Similarly, certain of the di-sec-amines that are parent compounds for derivatives of the present invention set forth in Table A, are per se effective antiozonants, and are claimed as such in copending applications by the present inventor in the case of the N-cyclohydrocarbon N'-alkyl substituted phenylenediamine antiozonants, and in said joint U.S. application S.N. 523,711 in the case of the N-aryl-N'-cycloalkyl substituted phenylenediamine antiozonants.

PROLOGUE AND OBJECTS

It is well known that many compounds possess the property of preserving rubber, when incorporated therein, against the superficial hardening and crazing resulting from attack by oxygen, light and heat. Such compounds are termed "antioxidants." However, as pointed out in said copending joint application, the previously known antioxidants have not been effective to guard against the distinctly different effects of ozone on such materials, of which the generation of deep penetrating cracks is characteristic.

It has long been recognized that a solution of the problem of ozone attack on both natural and synthetic rubber goods is greatly needed and that reduction or freeing of such goods from ozone attack is of high importance to both civilian and military consumers. Indeed, as early as 1944 the ASTM prescribed a testing procedure for measuring ozone attack in connection with essentially *static* goods, such as refrigerator gaskets, windshield mountings and the like.

It has more recently been recognized that when *dynamically flexed* rubber goods, such as tires, are made in the usual way with or without antioxidants, such articles are subject to deterioration by ozone attack, whether in continuous or intermittent use or storage.

As above noted, attack by ozone on statically or dynamically employed rubber goods becomes apparent by the development of penetrating cracks which progressively become deeper with time of exposure to the atmosphere, which practically always contains ozone in trace amounts. Such cracks in tires often become sufficiently deep to cause failure. Indeed, in the case of new tires stored for substantial periods, such cracks may cause failure within a relatively short time after the tires are put into use. This result of ozone attack is thus quite distinct from the development of fine surface cracks, i.e., checking and crazing, attributed to oxidative deterioration.

Ozone attack is extremely bad in areas indigent to cities such as Los Angeles, California, where smog conditions are associated with high ozone concentration, e.g., from 10 parts to 60 parts per hundred million. In Los Angeles and similar high-ozone areas so-called ozone cracks may develop in rubber articles such as tires, in less than a month of storage time. In areas such as Detroit, Michigan, the normal ozone concentration in the air is less than 5 parts per hundred million, and ozone cracks may not develop for several months.

In any event ozone-cracking is recognized as one of the heretofore important unsolved problems in storage and use of both civilian and military articles containing natural or synthetic rubber components, and the inventions in said copending applications, and herein aim to provide solutions for that problem, especially with respect to elastomers employed in dynamic usage.

For many years the rubber industry has employed chemicals such as Santoflex AW (the trade name for 6-ethoxy-2,2,4-trimethyl-1,2-dihydroquinoline) in rubber articles to protect the same against oxidation on aging. From a survey of chemicals used to protect the products of representative manufacturers of rubber goods, it appears that Santoflex AW had been widely accepted and used as one of the best materials available for that purpose. Accordingly, to demonstrate the ozone resistance afforded by new antiozonants, a GR-S compound, containing Santoflex AW, was compared with GR-S containing other antioxidant materials to demonstrate which of such materials seemed the most resistant to ozone attack after subjecting to heat aging conditions, and since the Santoflex AW seemed to be the best of the materials so compared, though itself affording no adequate protection of elastomers against ozone attack, it was used as a standard for comparison to evaluate the improved resistance to such attacks imparted by new and synergistic antiozonant compositions (see Table I of copending joint application, Ser. No. 523,711, filed July 22, 1955). In spite of the accepted usage of Santoflex AW in the industry it will be noted from the tables hereinafter, in which this material is used as control, that relatively little protection of elastomers against ozone cracking is afforded by Santoflex AW as compared to the antiozonants of the present invention, particularly after the samples had been heat-aged, thus simulating the conditions accompanying subjection of the elastomers to dynamic usage.

A desirable property in case of antiozonants, as in the case of any other additives to rubber, is inertness with respect to the curing ingredients of the elastomer compound. The vulcanized compounds after exposure to heat-aging (24 hours at 100° C. is taken as an exacting standard herein) should still show from about 275% to 375% or greater elongation to be suitable for tire stocks. Original and heat-aged stress-strain properties were therefore both obtained to demonstrate that normal vulcanizations are obtainable with the antiozonants incorporated in the elastomer compounds. For the sake of brevity, the tensile properties have been omitted from the table wherein the samples showed the physical properties required of the elastomer stocks. Certain compounds including benzidine resulted in a very short stock after aging (see Examples F-2, F-3 and G-2, Table I, of said copending joint application), while protection against ozone was good, such additives caused over-curing, thus rendering them unsuitable for use in GR-S stocks for manufacture of tires and many other articles of commerce.

Thus, principal objects of the present invention are the provisions of (1) new antiozonants or chemical compounds for incorporation into elastomer and plastomer compositions which alone will effectively protect same against ozone cracking, especially after heat aging, (2) synergistic combinations of said new antiozonants with known antioxidants for rubber and/or waxes which will effectively protect the same against ozone cracking, especially after aging or heat aging, without deleteriously altering the physical properties of the protected materials, (3) new methods of protecting elastomers and plastomers from ozone attack characterized by the use of such new materials, and (4) elastomer and plastomer articles including such chemicals and rendered ozone resistant thereby. Other objects and advantages of the invention will be made apparent from the following more detailed description and examples of its application.

The invention resides in the new antiozonants and compounds herein disclosed, the synergistic combinations thereof with antioxidants and/or waxes, the methods of applying said new antiozonants and synergistic combinations, and the improved products containing the same. This invention thus comprises, inter alia, (1) the new and useful antiozonants for rubber falling into the general class and categories set forth in Table A, which are subject to the restrictions and limitations therein set forth, and (2) those of said new antiozonants that are new and previously unknown chemical compounds, per se, and hence patentable as such, that fall into the general class and categories set forth in Table B, and which are subject to the restrictions and limitations therein set forth, as will be apparent from the following detailed description and examples, which are to be taken as illustrative and not restrictive of the invention, the scope of which is more particularly pointed out in the appended claims.

*Table A*

CATEGORIES OF ANTIOZONANTS ACCORDING TO THE PRESENT INVENTION, HAVING THE GENERAL FORMULA R—NA—R'—NB—R''

| R | Either of A and B (selected from) | R' (selected from) | The Second of A and B (selected from) | R'' | Limitation—total carbons in R' +hydrocarbon substituents R, A, B, and R'' |
|---|---|---|---|---|---|
| I<br>—pri-alkyl | 1. Non-Polar:<br>(a) hydrogen<br>(b) alkyl ($C_1$-$C_4$)<br>2. Polar:<br>(a) Halogenoid and Organo-halogenoid substituents, e.g.:<br>(1) nitroso-<br>(2) cyano ($C_1$-$C_{19}$) hydrocarbon, including α- and β-cycloalkyl, and -cycloalkenyl substituents, per se and substituted with alkyl-, cycloalkyl-, and aryl- radicals.<br>(3) Polycyanoalkyl polyamines, e.g., cyanohydrocarbon substituted poly (alkyleneamino)-alkyl substituents. | Unsubstituted or alkyl substituted p-phenylene and p-diphenylene radicals. | 1. Non-Polar:<br>=alkyl ($C_2$-$C_4$)<br>2. Polar:<br>(a) Halogenoid and Organo-halogenoid substituents, e.g.:<br>(1) nitroso-<br>(2) cyano($C_1$-$C_{19}$) hydrocarbon, including α- and β-cycloalkyl, and -cycloalkenyl substituents, per se and substituted with alkyl-, cycloalkyl-, and aryl-radicals.<br>(3) Polycyanoalkyl polyamines, e.g., cyanohydrocarbon substituted poly (alkyleneamino)-alkyl substitutents.<br>(b) Acyl($C_3$-$C_{20}$) | =sec-alkyl | 15–32 |
| II<br>-alkyl | | | | -aryl or cycloalkyl (unsubstituted or hydrocarbon substituted). | 13–31 |
| III<br>-cycloalkyl (unsubstituted or hydrocarbon substituted). | | | | -cycloalkyl (unsubstituted or hydrocarbon substituted). | 16–31 |
| IV<br>-sec-alkyl | | | | -sec-alkyl | 12–32 |
| V<br>Cycloalkyl | | | | -aryl | 17–31 |

Table B

CATEGORIES OF NEW AND USEFUL COMPOUNDS ACCORDING TO THE PRESENT INVENTION, HAVING THE GENERAL FORMULA R—NA—R'—NB—R"

| R | Either of A and B | R' | Second of A and B | R" | Limitation—total carbons in R'+hydrocarbon substituents R, A, B, and R" |
|---|---|---|---|---|---|
| I<br>-pri-alkyl | Same as in Table A. | Same as in Table A. | Same as in Table A except that when polar group 2(a)(2) is employed, other of A and B must be other than 1(a) and 2(a)(2). | sec-alkyl | 15-32 |
| IIa<br>-alkyl | | | | cycloalkyl (unsubstituted or hydrocarbon substituted). | 13-31 |
| IIb<br>-pri-alkyl | | | | aryl (unsubstituted or hydrocarbon substituted). | 13-31 |
| III<br>-cycloalkyl (unsubstituted) | | | | cycloalkyl (unsubstituted or hydrocarbon substituted). | 16-31 |
| IV<br>-sec-alkyl | | | | -sec-alkyl | 12-32 |
| V<br>cycloalkyl | | | | aryl | 17-31 |

As is evident from Tables A and B, the materials contained herein are all derivatives of mono- and di-arylene diamines, which in all cases are N,N'-di-hydrocarbon radical substituted. The substituents A and B, where other than hydrogen, may be introduced into the parent N,N'-di-substituted amines by reacting the latter with appropriate reagents as hereinafter described, or in other ways.

For simplicity of production it is preferred that each amino group of the parent compound be secondary and that the substituents of the substituted p-phenylenediamine antiozonant be hydrocarbon groups, preferably identical, although certain advantages are found for the use as parent materials of substituted p-phenylenediamines wherein one of the amino groups is substituted with an alkyl radical and the other amino group is substituted with a cyclic hydrocarbon substituent. Derivatives found in which A and/or B are other than hydrogen have definite advantages over the parent compound. For example, advantages in scorch time and/or aging characteristics of the elastomer compounds in which the said antiozonant is incorporated, or in other characteristics.

Also, while for greater antiozonant activity, it is preferred that R' be an unsubstituted or hydrocarbon substituted phenylene radical, within the broader aspects of the invention (see Tables A and B), diphenylene radicals selected from the group consisting of biphenylene, methylene-diphenylene, and iminodiphenylene, unsubstituted and hydrocarbon substituted, may be employed as R'. The N,N'-substituted, p-diamino-diphenylenes have been shown in the above identified joint application to have antiozonant activity, and the present invention has shown that the derivatives of these materials corresponding to those of Table A are similarly improved by the designated substituents at A and B.

In addition to the new compositions of matter of Table B I have discovered a new class of useful compounds which are represented by RNA—R'—N=R" wherein R is a hydrocarbon radical including acyclic and cyclic hydrocarbon radicals, R is a mono- or diphenylene radical as hereinbefore defined, A is any of the substituents listed for either A or B of Table A, and R" is a hydrocarbon radical joined to the nitrogen by a double bond.

The appropriate incorporation of the new antiozonants gives virtual immunity against much higher than ordinary atmospheric concentrations of ozone to elastomer compositions even when the same have been subjected to radical heat-aging, thus showing that these antiozonants are capable of protecting the products for long periods of time under conditions of dynamic usage as well as in static usages.

In the accompanying drawings pertaining to representative categories of the invention:

FIGURES 1 and 4 are illustrative charts drawn to simple coordinates.

FIGURES 2 and 3 are illustrative charts drawn to semi-logarithmic coordinates.

PREPARATION OF ANTIOZONANTS

Figure 1:
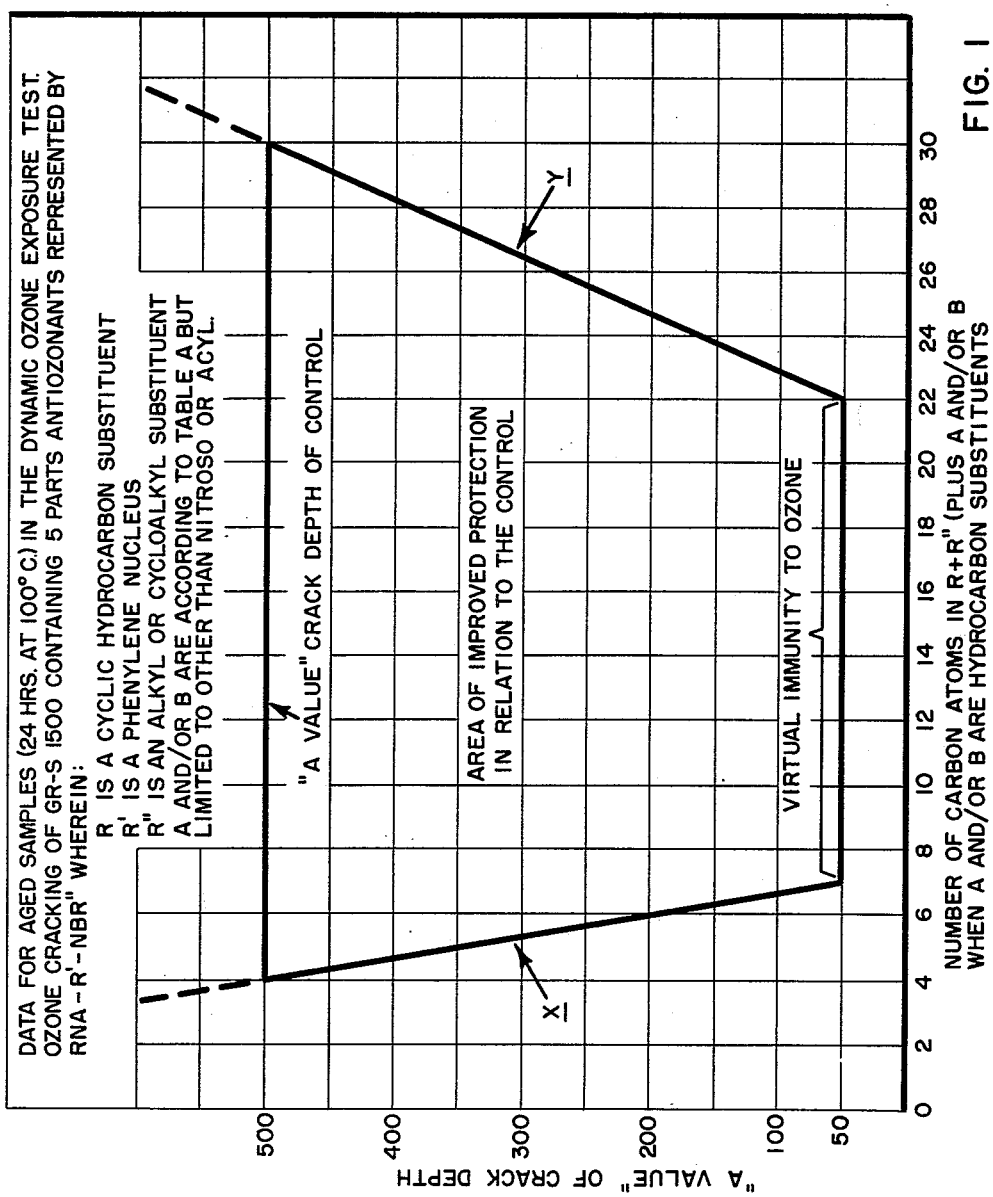

The parent symmetrical compounds of this invention may be prepared in a simple manner by aminative reductions of ketones with p-phenylenediamines and hydrogen. For example, one mole $NH_2$—$C_6H_4$—$NH_2$ plus 2 moles diisobutyl ketone plus hydrogen with a hydrogenating catalyst, such as copper chromite or Raney nickel, under the influence of heat and pressure, produce N,N'-disecondary-nonylderivatives of the diamines, namely, sec-nonyl-NH—$C_6H_4$—NH-sec-nonyl. The above reaction can be run with one mole of a first alkyl ketone per mole of p-phenylenediamine so that the first product contains sec-alkyl-NH—$C_6H_4$—$NH_2$, and this product can be further treated with a second alkyl ketone to effect substitution in the second amino group, or it can be used itself as a parent mono-substituted amine for preparation of A and/or B substituted derivatives as described in the second paragraph following.

An advantageous method for preparation of N,N'-di-substituted p-phenylenediamine wherein the substituents are not identical depends on reaction of p-nitroaniline and a ketone. The resultant p-nitro Schiff base is hydrogenated in the presence of a copper chromite, for example, to produce the coresponding p-R'—NH—$C_6H_4$—$NH_2$ this diamino product is then reacted with a second ketone in the presence of hydrogen and a catalyst to make R'—NH—C₆H₄NHR".

When N - phenyl-N'-sec-alkyl-p-phenylenediamine or N-cyclohexyl-N'-sec-alkyl-p-phenylenediamine is desired, aniline or cyclohexylamine, respectively, may be reacted with p-chloronitrobenzene to form p-nitrodiphenylamine or p-nitrophenylcyclohexylamine, respectively, which may then be reacted with a ketone under hydrogenating conditions to produce the unsymmetrical antiozonants. When A and/or B are other than hydrogen the substituent groups such as methyl, nitroso, acyl, cyanoethyl and tetra(cyanoethyl)-diethylenetriaminoethyl are introduced into the parent N,N'-disubstituted p-phenylenediamine. Thus the above described mono- and disubstituted amines are readily reacted by heating in appropriate solvents with (1) methyl sulfate, (2) nitrous acid, (3) fatty acids, fatty acid chlorides or esters of fatty acids, (4) the reaction products of hydrocyanic acid and aldehyde or ketone, e.g., lactonitrile, or (5) poly(cyanoalkyl) polyalkylenepolyamines such as penta(cyanoethyl)-diethylenetriamine, to introduce the desired groups. The reaction of R—NH—R'—NH—R" with a poly(cyanoalkyl)-polyalkylenepolyamine is illustrated by the reaction of N,N' - di-2-octyl-p-phenylenediamine with penta(cyanoethyl)-di-ethylenetriamine of Dr. Jennen's said copending U.S. application, S.N. 556,423.

must be used in larger amounts when used as the sole additive to protect against both oxygen and ozone. The new compounds are specific and differ from other materials of the classes diarylamines, dialkylamines, arylenediamines, and their derivatives, in that other members of these categories generally will not effectively protect against attack by ozone as is demonstrated by the research summarized in said copending joint application, Table I.

The new antiozonants comprising Part I of this invention comprise those falling in categories I, II, III, IV and V set forth in Table A, above.

Specific ranges of these categories of materials (Table A) are antiozonants when used alone in amounts of about 2 parts or more per 100 parts of the high polymers to be protected and are claimed as such herein. The amounts employed for the mono-nitroso and mono-acyl derivatives of the p-phenylenediamines should be increased to some extent (Examples A-2, -3 and -4) because of the increase in molecular weight of the diamine resultant from conversion to said derivatives. The last statement does not apply to the other derivatives of this invention (e.g., Examples D-2, -3, B-1, -2, C-9-10).

Part II of this invention discloses synergistic combinations of the antiozonants of Part I hereof with antioxidants and/or waxes.

The antioxidants that show this synergistic effect with the above mentioned antiozonants are members of the

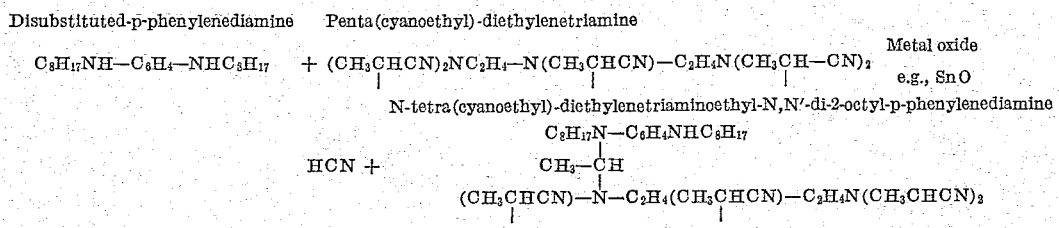

While this reaction mechanism has not been conclusively demonstrated, the reaction product of one mole of a poly(cyanoalkyl) polyalkylene polyamine with one mole of disubstituted phenylenediamine in the presence of a trace of metal oxide is found reproducible and unique and possessive of antiozonant properties (Examples B-1 and E-2).

Where only one of A or B is to be so substituted one mole of substituted diamine is reacted with one mole of reactant (1), (2), (3), (4), or (5). When both A and B are to be substituted one mole of the disubstituted diamine is reacted with two moles of (1), (2), (3), (4) or (5) respectively or a combination of any two thereof. For example, appropriate solvents for effecting these reactions are: water and dioxane for methyl sulfate; water for nitrous acid; and benzene, if desired, for lactonitrile; no solvent being necessary for the fatty acids and their derivatives; or for the polycyanoalkylpolyamines. There are other practical methods of preparation, and the described methods are mentioned as illustrative only.

GENERAL DESCRIPTION

The research has shown that the new compounds are valuable antiozonants for plastomers and resins as well as for natural and synthetic rubbers and are particularly useful antiozonants for tires and like natural and synthetic products subject to ozone attack at high operating temperatures, such as those temperatures attained by heavy duty truck tires, which temperatures may rise as high as 300° F. in use. Antiozonants are herein defined as additive agents which protect the polymeric material, e.g., natural and synthetic rubbers, against deterioration due to ozone attack. While serving as antiozonants, the new compounds also serve as antioxidants, i.e., the new products of this invention protect against deterioration of tensile properties caused by reaction of vulcanized rubber with oxygen. However, the new antiozonants following classes: amines and diamines; phenolics; hydroquinones and substituted hydroquinones; organic phosphites; aromatic esters; and thioamides.

The waxes found useful in developing synergistic antiozonant activity are the paraffin waxes and microcrystalline waxes and blends thereof.

This second part of the present invention thus comprises the discovery that highly active synergistic antiozonant compositions can be prepared from any of the antiozonants of Part I of this invention when used in lesser amounts than above stated, and even in amounts less than 2 parts/100 parts of the high polymer to be protected, in combination with suitable proportions of known rubber antioxidants and/or certain thioamide antioxidants and/or waxes.

Further this invention includes the incorporation of the new antiozonants of Parts I and II of this invention into high polymeric materials and into latices thereof, and the ozone resistant products therefrom.

It has been disclosed in the aforesaid copending joint U.S. application that when N,N'-hydrocarbon substituents on the otherwise unsubstituted p-phenylenediamine contain less than 12 or more than 25 carbon atoms the virtual immunization against ozone is not obtained. It is the applicant's hypothesis that migration of the antiozonant is necessary to prevent ozone crack initiation at the air-rubber interface, and that the ability of the antiozonant to migrate is curtailed when the number of carbon atoms constituting the N,N'-substituents is in excess of about 25, and further that when the number of carbon atoms in such substituents is too small the additives migrate to the surface of the rubber compound and are lost by volatilization from heating or simple aging, and thus cannot protect the product. Thus for effective antiozone activity compatibility, migratability, and volatility of the diamine antiozonant of this invention are important interdependent characteristics. However, regardless of the mechanism of protective action or the reason therefore, it has been discovered by the present inventor that the compounds of the several categories of Table A, herein, in which the hydrocarbon substituents contain not less than 7 or more than 26 carbon atoms, and at least one of which substituents is an alkyl group on one of the nitrogens, represents the class of compounds which are effective as antiozonants.

To illustrate the observed critical nature of the number of carbon atoms in the alkyl substituents, and to show how such observed data fits the above hypothesis, there is presented herewith a diagram (FIGURE 1) showing the virtual immunity (measured by the "A value" procedure herein explained) of GR–S 1500 type synthetic rubber protected from ozone cracking by 5 parts of antiozonants of categories II, III and V of Table A, represented by RANR'NBR" when the number of carbon atoms in "R+R'''" of the formula (in which R and R" are hydrocarbon radicals and at least one of them is a cycloalkyl or alkyl radical and R' is an arylene nucleus) is at least 7 and not more than 26, i.e., total carbon per Table A limitation 13–32 when R' is phenylene. When A and/or B are hydrocarbon constituents the above limitations on "R+R'''" are applicable to the total hydrocarbon substituents, i.e., "R+R"+A and/or B." In this diagram and "A value" or 50 or less represents virtual immunity from ozone attack; while at an "A value" above 500, the samples are not considered an improvement over the usual Santoflex AW antioxidant control compound simultaneously exposed to ozone during the period of dynamic testing. When "A values" are obtained that lie from about 50 to about 500 the specimens show an improvement in relation to the data on crack depth for the control compound, i.e., the antiozonants show relative effectiveness for ozone protection in the range above virtual immunity but still better than the control. The line "X" represents the loss of immunity to ozone attack after aging when the antiozonant is lost by migration to the elastomer surface and volatilization; the line "Y" represents the loss of immunity to ozone attack when the ability of the antiozonant to migrate to the surface is inadequate.

Diagrams similar to FIGURE 1 may be drawn for the antiozonants of categories I and IV of Table A in which A and/or B is other than hydrogen. Since FIGURE 1 is typical and illustrative of the nature of such diagrams, and of the carbon limits set forth in Table A for protection of dynamic goods thereby, such further diagrams are omitted herein in the interest of brevity.

FURTHER GENERAL DESCRIPTION

Figure 2:
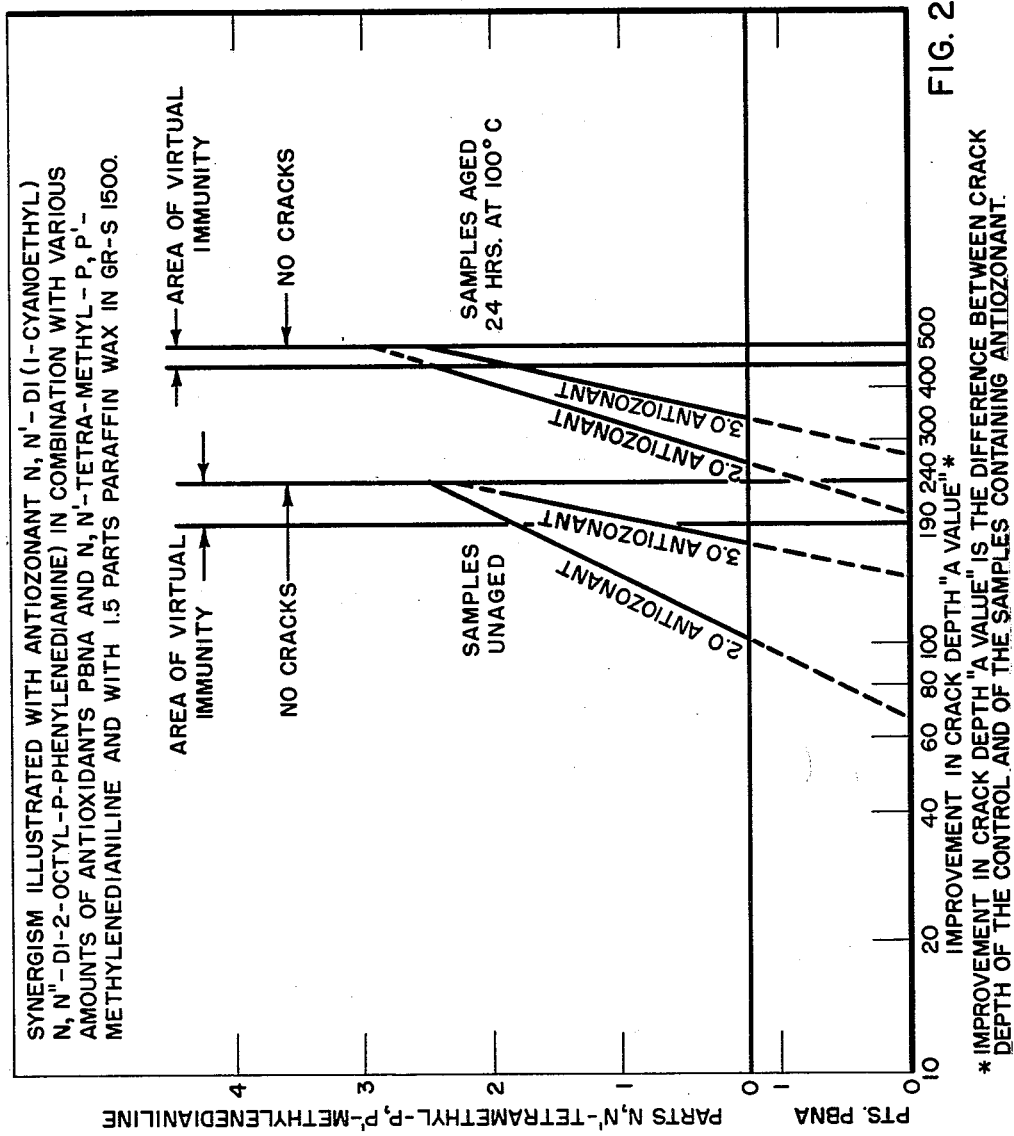

In the first part of the invention of the aforesaid joint application it is shown that an N-aryl-N'-cycloalkyl-p-phenylenediamine (with or without hydrocarbon substituents on its ring structures), when incorporated into elastomer compounds in amounts exceeding 3 parts per hundred of elastomer, effects protection against ozone cracking. N-phenyl-N'-1-methylcyclohexyl-p-phenylenediamine is an example of such a parent substituted diamine antiozonant, derivatives of which as indicated in Table A, have now been discovered to be antiozonants. As shown in FIGURES 2 and 2A of said joint application, 3 parts of such parent antiozonant per 100 of elastomer show fair protection against ozone while virtual immunity is obtained with about 3.5 parts/100 of elastomer and 0.5 part wax, when no antioxidants are present. With 1.5 parts wax, 3.0 parts said antiozonant gives virtual immunity to ozone attack.

It has been found that the substituted antiozonants of Table A herein, behave in a manner similar to parent antiozonants when used in combination with antioxidants and/or waxes. This is unexpected and unpredictable in view of the diluent effect of substituent groups on the parent diamine. FIGURE 2 is a chart drawn for one of the new antiozonants of Table A; demonstrating synergism with antioxidants. Since FIGURE 2 is representative, further charts are unnecessary to an understanding of this part of the present invention, and hence have been omitted for brevity.

With the small amount of antioxidant (such as 1.25 parts phenyl-beta-naphthylamine) that is ordinarily incorporated at the rubber manufacturing plants, substantially the same quantities of the antiozonant are required to obtain virtual immunity from ozone attack. However, the present research has shown that with larger quantities of antioxidants present, or with certain quantities of waxes that per se have no appreciable antiozonant effect, a synergism is developed and lesser quantities of the antiozonants will then give virtual immunity to ozone attack. The synergism of metal salts in combination with the antiozonants of the first part of this invention is disclosed in the third part of said copending joint application which shows that protection against ozone attack may be obtained with as little as 0.5 part of the antiozonant material, so used.

The amounts of synergistic rubber antioxidants and/or waxes used in these synergistic combinations of Part II of this invention may vary with the specific antioxidant and/or wax, but in general are in the range of 0.5 to 5.0 parts/100 parts of elastomer. (See FIGURE 3 demonstrating synergism with two antiozonants of Table A herein.) Expressed in terms of the proportions of the synergistic composition, such composition thus may comprise from 1 to 9 parts of antiozonant for rubber according to Table A, from 0 to 9 parts of antioxidant for rubber, and from 0 to 9 parts wax, per 10 parts of the synergistic composition. (See FIGURE 4 demonstrating the effect of increasing amounts of representative antiozonants of Table A herein.)

The amine type antioxidants which, in combination with the above substituted phenylenediamines, produce good antiozonant compositions for elastomers and elastomer combinations, as above noted, include conventionally used amine antioxidants, amine-carbonyl-condensation products, tetrahydroquinoline derivatives and the like. More specifically the antioxidants tested for forming synergistic antiozonant combinations with the appropriately substitued phenylenediamines are set forth in Table C below; the synergistic waxes include paraffin and microcrystalline waxes and blends thereof.

The new antiozonants and/or the synergistic antioxidants and/or waxes can be appropriately incorporated into the elastomer. For example they may be added to the elastomer latex so that the final coagulated elastomer composition contains the desired antiozonant or components of the synergistic antiozonant compositions of this invention, whichever is desired. The elastomer latex may then be coagulated either in the conventional procedures, such as with salt-acid, glue, alum, etc., or with tin and/or iron group salts as described in Part III of my copending application, when the advantages thereof are desired.

Table C

ANTIOXIDANTS SHOWING SYNERGISM WITH ANTIOZONANTS

Amines:
 6-ethoxy-2,2,4-trimethyl-1,2-dihydroquinoline (Santoflex AW)
 2,2,4-trimethyl-1,2-dihydroquinoline polymer (AgeRite Resin D)
 Diphenylamine-acetone condensation products (BLE–25)
 Phenyl-beta-naphthylamine (PBNA)
 Phenyl-alpha-naphthylamine (PANA) (Neozone A)
 Aniline-acetone reaction products (Flectol H)
 Aniline-butyraldehyde reaction products (Antox, A–32, Beutene) [1]
 Di-alpha-naphthylamine
 Di-beta-naphthylamine
 Phenylene-diamine (ortho, meta, and para forms)

---
[1] See "Compounding Ingredients for Rubber," 2nd Ed., India Rubber World, 1947.

p,p'-Diaminodiphenylmethane (Tonox)
p-Aminodiphenylamine
1,2-dianilinoethane (Diphenylethylenediamine)
o-Tolidine
N,N'-diphenyl-p-phenylenediamine (Perflectol X)
Naphthylenediamine
Di-p-methoxydiphenylamine (Thermoflex)
N,N'-di-sec-butyl-p-phenylenediamine (Tenamene 2)
N,N'-di-beta-naphthyl-p-phenylenediamine (AgeRite White)
N,N'-di-beta-ac-tetrahydronaphthyl-p-phenylenediamine
N,N'-di-alpha-naphthyl-p-phenylenediamine
Tetraethylenepentaminopropionitrile
Mixture of isopropoxydiphenylamine, diphenyl-phenylenediamine and phenyl-beta-naphthylamine (AgeRite Hipar)
Rosinamine D (Tech-Grade dehydroabietylamine)
Dodecylamine
N,N'-tetramethyl-p,p'-di(aminophenyl)methane
N-dimethyl-p-phenylenediamine Thioamides:
 Thioacetanilide
 Thiocarbanilide
 Thioacetamide
 Dibenzylthiourea
 Phenylacetothiomorpholide

PREPARATION AND TESTING PROCEDURES

The procedure employed in compounding and testing the elastomer-amino-additive compositions for the examples of Tables I and II herein was as follows: as control samples "cold" GR-S synthetic rubber (GR-S 1500 polymerized at 41° F. or GR-S 1600 which is the same except that 50 parts HAF carbon black are incorporated at the polymer plant) was compounded and vulcanized according to best known commercial practice to obtain good aging properties. Then similar compounds were prepared and vulcanized with our new antiozonants present as additives. The recipes employed for the several elastomer compounds were as follows:

| Elastomer (100 pts.) | Neoprene Type WHV | Nitrile Rubber Hycar 1014 | Natural Rubber | Butyl GR-I-17 | GR-S (Cold) |
|---|---|---|---|---|---|
| Ingredients: [a] | | | | | |
| Philblack "O" (carbon black) | | | | | 50 |
| Thermax (carbon black) | 150 | | | | |
| Statex 125 (carbon black) | | 40 | | | |
| Micronex W-6 (carbon black) | | | 50 | 65 | |
| Zinc oxide | 5.0 | 3.0 | 3.0 | 5.0 | 3.0 |
| Stearic acid | 0.5 | 1.0 | 2.5 | 3.0 | 1.5 |
| PBNA | | | 1.0 | | |
| BLE-25 | | 1.5 | | | |
| Neozone A | 2.0 | | | | |
| Medium Pine Tar | | | 4.0 | | |
| TP-90B (plasticizer) [b] | | 16.0 | | | |
| Dioctylphthalate (plasticizer) | 30.0 | | | | |
| Paraflux 2016 [c] | | | | | 3.5 |
| Circo Light Oil (Sun Oil Co.) | | | | 20 | 3.5 |
| Atlantic 1115 wax | 0–1.5 | 0–1.5 | 0–1.5 | 0–3.0 | 0–3.0 |
| Light Calcined MgO | 4.0 | | | | |
| Altax [d] | 0.5 | 1.5 | 1.0 | 0.5 | |
| Monex [e] | 0.5 | | | | |
| Methyl Tuads [f] | | | | 1.0 | |
| Santocure [g] | | | | | 1.25 |
| Sulfur | 0.5 | 1.5 | 2.5 | 2.0 | 2.0 |
| Antiozonant and other additive | as shown | | | | |

[a] Curing ingredients are described in "Compounding Ingredients for Rubber," 2nd edition, published by India Rubber World, 1947.
[b] High molecular weight polyether sold by Thiokol Corp.
[c] Saturated polymerized hydrocarbon sold by C. P. Hall Co.
[d] Benzothiazyl disulfide.
[e] Tetramethyl thiuram monosulfide.
[f] Tetramethyl thiuram disulfide.
[g] N-cyclohexyl-2-benzothiazole sulfenamide.

Polycyanohydrocarbonpolyamines of Ser. No. 566,423, filed December 30, 1955 [2]
Phenolic:
 Parazone (p-phenyl phenol)
 Santovar O (2,5-di-tert-butyl hydroquinone)
 Hydroquinone
 Antioxidant 2246 (a p,p'-bisphenol)
 Santowhite Flakes (a dibutyl-phenyl sulfide)
 Santovar A (2,5-di-tert-amylhydroquinone)
Phosphites:
 Triphenyl phosphite
 Tri(nonylphenyl) phosphite (Polygard)
Aromatic esters:
 Glycerol monosalicylate ester
 Dipropylene glycol monosalicylate ester

[2] Corresponding Belgian Patent No. 553,700 and corresponding French Patent No. 1,170,742; these cyano-alkyl amines are those containing at least one cyano-group and at least one amino group and having a total carbon count per molecule of from 2 to 30 carbon atoms, which include the alpha- and beta-cyanoalkylamines, polycyanoalkylamines, cyanoalkyl-polyamines and polycyanoalkyl polyamines falling within said carbon count range.

In certain cases other waxes were substituted for the Atlantic 1115 of the above formulae. For example Sunproof, Heliozone and Witco 127 were found to be effective but not entirely equivalent in synergistic activity in combination with the antiozonants of the present invention. For neoprene and butyl rubber the plasticization required for low temperature performance results in nullifying a major portion of the inherent ozone resistance of the polymer itself, and accordingly the antiozonants of the present invention are useful in such neoprene and butyl stocks.

These various elastomer samples were cured at about 1000 p.s.i. in a steam heated press at 285° F. with curing times adjusted in the range from 30 to 120 minutes, as required to obtain optimum tensile properties for each specific compound. Samples of each of the cured stocks were heat-aged for 24 to 48 hours at 100° C. and were then subjected to ozone exposures in both dynamic and static tests.

The examples in the tables herein are limited to sulfur-cured vulcanizates, however, sulfurless curing systems for example with tetramethylthiuramidisulfide, peroxide curing systems such as with dicumyl peroxide, benzoquinone dioxime, radiation curing systems using a radiation source such as cobalt 60, metal oxide curing of acid elastomers as for example zinc oxide and butadiene-acrylic acid copolymers and similar curing systems can be used effectively with elastomers containing the antiozonants and synergistic antiozonant compositions.

The dynamic ozone test was conducted on ½ inch dumbbell specimens of the vulcanizates. The exposure to ozone was carried out in an aluminum-lined ozone cabinet where the concentration of ozone was usually held at 50±5 p.p.h.m. of air. This high ozone concentration is used (25±5 p.p.h.m. is specified by ASTM test D–1149–51T) to demonstrate the protective effect of the antiozonants in a reasonably short time of evaluation and to approximate the atmospheric ozone concentrations reported at high altitudes attained by aircraft, and at ground level in the Los Angeles areas and parts of New Mexico and Alaska under certain climatic conditions. Occasionally more highly accelerated ozone exposure tests were conducted by employing ozone concentrations as high as 150 p.p.h.m. With such high ozone concentrations much shorter times are required to obtain valid comparisons of the protective action of the additives under test (e.g., about 8 hours). Each sample was stretched and relaxed continuously at a rate of 30 times per minute, between 0 and 20% elongation on the total sample (0 to 28% on the narrow portion suffering the elongation) to simulate conditions of dynamic use of the rubber. After each test, usually of 40 to 70 hours' duration, a specimen taken from the center part of the narrow part of the dumbbell was placed under the microscope and the depth of the observed cracks was measured. The depths of the deeper 50% of the observed cracks were averaged, and this average was designated the "A value" and was taken as the index of ozone attack. With each group of 5 to 12 experimental samples control samples containing Santoflex AW were simultaneously subjected to the same dynamic ozone test, and the average crack depth "A value" was compared with the "A value" for the crack depths of the control samples as a basis of evaluation.

In the work on which this application and said copending application has been based, it has been demonstrated that where antiozone protection is obtained in the dynamic tests, protection is also afforded in static use. The static tests run on both heat-aged and unaged samples showed this to be true without exception. (The converse is not always true, e.g., some static protection is afforded by paraffin and microcrystalline waxes, which are valueless for protection of rubber articles subjected to dynamic usages.) Specimens for static testing were mounted in accordance with ASTM procedure D518–44, Method B. The mounted samples were placed in the ozone exposure cabinet wherein the ozone concentration was held at a concentration of 25±5 p.p.h.m. or 50±5 p.p.h.m. at a temperature of 40° C. In this static test the samples were observed periodically and the time was measured to the appearance of the first crack. Since such static test data are merely confirmative of data obtained dynamically, static ozone exposure tests for the antiozonants of the present application are omitted herefrom for the sake of brevity. It suffices to state that long continued tests show that where virtual immunity against ozone was obtained with an antiozonant or a synergistic antiozonant composition in a 70 hour test at 25±5 p.p.h.m. of ozone or a 40 hour test at 50±5 p.p.h.m. of ozone, static protection up to one year was obtained at the same ozone concentration (i.e., 25 p.p.h.m.) without appearance of ozone cracks. The Santoflex AW controls showed severe cracking in the 70 hour test and failed in about 100 hours or less under the same static test conditions.

Similarly mounted panels of specimens (ASTM procedure D518–44) were also statically tested in outdoor weather experiments in Florida (Miami), California (Los Angeles), and Michigan (Detroit). In California, where highest concentrations of ozone occurred over the time of the test (varied from 5 to 60 p.p.h.m. dependent on weather variations) up to six months' outdoor exposure were required to develop cracks (ASTM rating 4) in the samples containing antiozonants or synergistic antiozonant compositions. The Santoflex AW controls not only cracked but failed in a month under simultaneous exposure. In the Florida and Michigan tests the protected samples did not crack in a one-year test whereas the control samples not only cracked but failed in the same test. The rating method for the static exposure tests is shown by the following tabulation:

| Rating | Development in Static Tests |
|---|---|
| 0 | No development of any kind. |
| 1 | Microscopic cracking. |
| 2 | Fine visible cracking. |
| 3 | Pronounced visible cracking. |
| 4 | Severe visible cracking. |

SYNERGISM

In more detail, the second part of the present invention comprises the discoveries of antiozonant compositions which rely on the action of synergistic antioxidants, paraffin and/or microcrystalline waxes in combination with specific derivatives of dihydrocarbon substituted p-phenylenediamines. When used in more than 3 parts per 100 parts of elastomer the said derivatives of p-phenylenediamine give virtual immunity to ozone attack per se. However, in combinations with certain antioxidants it has been found that reduced amounts (e.g., 0.5 to 3.0 pts.) of the said specific p-phenylenediamine derivatives in combinations with 1.5 to 6 pts. total of specific antioxidants serve to protect elastomers against ozone deterioration, although the antioxidants by themselves do not impart ozone resistance to the elastomer compounds, nor do the reduced amounts of said specific diamino derivatives alone (i.e., in the absence of the specific antioxidants) show adequate protection of the elastomer compounds. Such admixed and/or interacted components which develop antiozonant activity in protection of elastomers and plastomers are termed herein "synergistic compositions."

Thus I have made the discovery that certain antioxidants identified herein (see Table C) themselves incapable of protecting elastomers and plastomers against ozone, have the property of greatly increasing the effectiveness of reduced amounts of my specific antiozonants in elastomer and plastomer compositions. Such antioxidants I refer to herein as "synergists."

Still another alternative interpretation of my invention is that a small amount of a diamino derivative, which itself can impart ozone resistance to elastomer and plastomer compositions incorporating said derivative in certain minimum amounts can develop ozone resistance in antitoxidants when admixed therewith in less than such minimum amounts.

The mechanism of the action of such antioxidants in synergistic antiozonant composition is not entirely understood. One possible explanation is that the diamino antiozonants themselves may enter to some extent into the complex vulcanization reactions in the curing of the elastomer compositions, and that the synergistic antioxidant alters the degree to which the diamino antiozonant so enters the vulcanization reaction. However, the exact mechanism is immaterial to the practice of the invention which the subsequently discussed data serve to exemplify.

It is also apparent that the wax component is an important component of some of the synergistic compositions. Thus virtual immunity resulted with 3.0 parts of the dicyanoethyl derivative of N,N'-di-2-octyl-p-phenylenediamine antiozonant, 2.25 parts PBNA and 3 parts wax (FIGURE 3); whereas with the same amounts of the antiozonant and PBNA but with 1.0 or 2.0 parts wax virtual immunity was not attained. Similar synergistic effect of wax with other antiozonants of the present invention are apparent from FIGURE 3; further figures and data, while similar have been omitted for the sake of brevity.

I have found that while paraffin and microcrystalline wax and combinations thereof per se give some protection to static samples of vulcanized elastomers no protection is afforded vulcanized elastomers in dynamic usage. My findings confirm John O. Cole. In G. S. Whitby's treatise entitled "Synthetic Rubber," published in 1954 by John Wiley & Sons, Inc., New York City, on page 541 Mr. Cole states, "It should be pointed out that, under dynamic flexing, wax offers no protection to either GR-S or natural rubber" (from the deterioration by ozone).

In contrast to this fact I have shown that waxes when used with the antiozonants of this invention act synergistically, that is, they enhance the protection value of the antiozonants.

OBSERVED RESULTS

Table I shows data for antiozonants of the several categories of Table A incorporated in GR-S 1500 samples subjected to the dynamic ozone exposure test. Table II contains examples of antiozonants of the same categories of this invention in other elastomers subjected to similar dynamic ozone tests. Because of the necessity of having separate controls for each group of samples tested, samples containing Santoflex AW were tested with each group of samples containing other amino compounds to monitor the procedure and to give assurance that the several results were valid for evaluating the relative effectiveness of the several amino compounds for protection of GR-S against ozone attack.

Ortho- and meta-diamino aromatic compounds are relatively inactive as antiozonants as disclosed in said copending joint application, also certain compounds, such as phenyl-alpha-naphthylamine, di-beta-naphthylamine, hydronaphthylamine derivatives, although good antioxidants are not good antiozonants.

Certain compounds show some protection against ozone in comparison with Santoflex AW, e.g., N,N'-disecbutyl-p-phenylenediamine, but after heat-aging protection against ozone is negligible. It should also be called to attention that the GR-S 1500 examples of Table I contained about 1.25 parts of either phenyl-beta-naphthylamine (PBNA) or a di-phenylamine-acetone condensation product (BLE) in addition to the other additives shown. Also certain other compounds show antiozonant activity but cannot be used in most elastomers because of their strong accelerating action on the vulcanization of elastomers resulting in scorchy stocks, e.g., primary amino compounds such as benzidine and 4-aminodiphenylamine.

The ozone cracking in the case of the controls was greatly in excess of the 50 microns "A value" which represents virtual immunity to ozone attack, while the elastomers compounded with the new antiozonants of Table A are better than the controls and generally approach or are within the range of that permissible "A value."

In comparative studies a few specific compositions of matter were discovered jointly by the applicant and R. G. Spain as disclosed in the aforesaid copending application, which new compositions were more effective than Santoflex AW, and are represented by the formula

R—HN—A—NHR' in which A is p,p'-biphenylene, methylenediphenylene, or p,p'-iminodiphenylene and one or both of R and R' are alkyl groups containing 6 to 11 carbons. Derivatives of these parent antiozonants wherein the hydrogens of the just mentioned antiozonants are substituted as shown in the categories of Table A, are herewith disclosed to be antiozonants for protection of various elastomers.

Data for specimens prepared from "hot" GR-S (GR-S 1002) were very similar to those for "cold" GR-S set forth in Table I and have therefrom been omitted for the sake of brevity.

Likewise parent di-sec-amines, which form new derivatives active as antiozonants and shown in Table A, are disclosed in copending applications by the present inventor, such parent diamines being N-cyclo-hydrocarbon-N'-alkyl-p-phenylenediamines.

In similar compounds the antiozonants of the present invention shown in the five categories of Table A protect elastomers of various types against ozone.

Similarly, data for protected and unprotected polybutadiene, Philprene and BS/S/AA (butadiene/styrene/acrylic acid terpolymer), butyl rubber, neoprene, Hycar and natural rubber further demonstrate the extreme effectiveness of the new antiozonants, the last four of which are exemplified in Table II.

It has been demonstrated that the addition of from 1 to 5 parts of the new antiozonants of this invention, Table A, increases the time preceding appearance of the first ozone cracks in static samples as much as 1000-fold over the time of appearance of first crack in synthetic rubber articles which have been prepared according to the best manner available prior to the discovery of the new antiozonants set forth herein as well as in the copending joint application. Data for the dynamic test of typical antiozonants of Table A are exemplified in FIG. 4 for the range up to 5 pts. antiozonants.

FIGURE 3 exemplifies wax synergism with the new antiozonants in GR-S 1500, and FIGURE 2 shows synergism obtained with other antioxidants in GR-S 1500 in combination with antiozonants of this invention. While data of the same type shown in FIGURES 2 and 4 have been obtained for antiozonants of all categories of Table A in various synthetic elastomers, similar curves although not identical are omitted herein for the sake of brevity since they are merely confirmatory of the disclosures of FIGURES 2 to 4.

A series of elastomer compounds was prepared which conclusively establishes that the synergistic action with the antiozonants of PBNA (phenyl-beta-naphthylamine) and BLE (acetone-diphenylamine condensation product) in the small quantities commonly introduced at the GR-S rubber plants is relatively insignificant, and that the data based on compositions including commercial GR-S afford a valid basis for evaluation of the antiozonants per se, as well as in synergistic combinations with other more active synergistic antioxidants and/or with significant quantities of PBNA and/or BLE.

In FIGURE 1 dynamic ozone exposure data are shown delineating the limitations on the carbon count of the hydrocarbon substituents "R+R" plus A and/or B," of the antiozonants of categories II, III and V wherein A and/or B are other than nitroso or acyl groups and when R' is phenylene. Such curves are the bases for the limitations shown in the several categories of Table A. The interpretation of FIG. 1 has been considered more fully hereinbefore.

In comparative studies limitations on carbon count were established for (1) specific new compositions of matter of categories I and IV, Table A, discovered by the applicant to be effective antiozonants, and for (2) N-nitroso- and N-acyl derivatives of categories I to V inclusive of the invention of Table A herein, as well as for (3) the antiozonants of said copending joint application. For the sake of brevity analogous curves for such limitations as shown in Table A are omitted herefrom.

For example data for antiozonants derived from further substitution of antiozonants from said copending joint application, said antiozonants being represented by the formula R—NA—R'—NBR", in which R' is a member of the group comprising p,p'-biphenylene, p,p'-methylenediphenylene, and p,p'-iminodiphenylene, and (1) both of R and R" are alkyl groups or cycloalkyl groups or in which (2) R is aryl and R" is an alkyl or a cycloalkyl group, and A and/or B are as shown in Table A, demonstrate that the limitations on carbon count of the substituted antiozonants are applicable as listed in Table A.

It is called to attention that Santoflex AW shows no protective action against ozone for neoprene and butyl rubber and accordingly was not incorporated into the control compounds.

Finally the data for elastomer compounds show among other things, (1) how the minimum of the antiozone effective range of carbon atoms in the hydrocarbon substituent groups is affected when at least one substituent contains an aryl or cycloalkyl group, (2) the synergistic effect of antioxidants, and (3) the effectiveness of these diamine antiozonants even when one or both nitrogens are disubstituted.

Examples D–3–4 demonstrate that cyanoethyl radicals can replace either one or both remaining hydrogens of the parent bis-sec-alkyl-p-phenylenediamine antiozonant without detracting from the antiozonant activity of the latter, the higher molecular weight notwithstanding.

As mentioned under methods of test, data for static ozone tests and for outdoor weathering tests confirm the dynamic test results with regard to the antiozonant compositions of the present invention, but as such tests are less stringent than the dynamic test and as such data are only cumulative they have been omitted herefrom for brevity.

*Table I*

GR-S 1500 CONTAINING ANTIOXIDANT ADDED AT THE POLYMER PLANT; WITH ANTIOZONANTS OF TABLE A HEREIN NEWLY DISCOVERED BY THE PRESENT INVENTOR, USED IN SYNERGISTIC COMPOSITIONS CONTAINING PARAFFIN WAX ACCELERATED DYNAMIC OZONE EXPOSURE; OZONE @ 50±5 P.P.H.M.; 40° C. hrs.; 30 FLEXURES PER MIN.

| Example | Sample No. | Pts. Additives | Wax Pts. | "A Value" Crack Depth (microns) | |
|---|---|---|---|---|---|
| | | | | Unaged | Aged 24 hrs. at 100° C. |
| Group A: | | | | | |
| 1 | K-98 | 3.0 N,N'-Di-2-octyl-p-phenylenediamine, Lot #6 | 1.5 | 85 | 140 |
| 2 | M-1 | 7.5 Monostearamide of N,N'-di-2-octyl-p-phenylenediamine | 1.5 | 30 | 40 |
| 3 | F-67 | 3.75 N,N'-Di-2-octyl-p-phenylenediamine+3.5 stearic acid | 1.5 | 30 | 40 |
| 4 | K-27 | 3.0 N-Nitroso-N,N'-di-2-octyl-p-phenylenediamine | 1.5 | 85 | 120 |
| 5 | P-4 | 5.0 N,N'-Di-2-octyl-N-methyl-p-phenylenediamine | 1.0 | 30 | 10 |
| 6 | J-00 | 6.0 Monooctanoamide of N,N'-di-2-octyl-p-phenylenediamine | 1.5 | 40 | 50 |
| 7 | Control | 13.0 Reaction product of 5 pts. N,N'di-2-octyl-p-phenylenediamine and 8.55 pts. stearic acid (mole ratio 2/1). | 1.5 | 200 | 450 |
| 8 | Control | 2.0 Santoflex AW | 1.5 | 200 | 450 |
| Group B: | | | | | |
| 1 | Q-81 | 5.0 Reaction product of SnO (0.03 mole); penta(cyanoethyl)-diethylenetriamine (0.1 mole); N,N'-di-(1-ethyl-3-methyl-pentyl)-p-phenylenediamine (0.15 mole); and AgeRite Resin D (0.12 mole). | 0 | 40 | 40 |
| 2 | Q-82 | do | 1.5 | 30 | 60 |
| 3 | Control | 2.0 Santoflex AW | 1.5 | 190 | 310 |
| Group C: | | | | | |
| 1 | Control | 2.0 Santoflex AW | 1.5 | 250 | 490 |
| 2 | R-18 | 5.0 N-Butyl-N'-1-isobutyl-3-methylbutyl-p-phenylenediamine | 0 | 65 | 230 |
| 3 | R-19 | do | 1.5 | 50 | 240 |
| 4 | N-26 | 5.0 N-2-Butyl-N'-2-tridecyl-p-phenylenediamine | 0 | 40 | 140 |
| 5 | V-27 | do | 1.5 | 30 | 120 |
| 6 | T-47 | 5.0 N,N'-Di-2-butyl-N,N'-diisobutyl-phenylenediamine | 1.5 | | 150 |
| 7 | Control | 6.0 Santoflex AW | 1.5 | 40 | 130 |
| 8 | Control | 2.0 Santoflex AW | 1.5 | 200 | 270 |
| 9 | T-27 | 5.0 N-Diethyl-N'-cyclohexyl-p-phenylenediamine | 0 | 0 | 50 |
| 10 | T-28 | do | 1.5 | 0 | 0 |
| Group D: | | | | | |
| 1 | S-94 | 5.0 N-Monocyanoethyl derivative of OZO-88* | 0 | 30 | 65 |
| 2 | S-95 | do | 1.5 | 60 | 60 |
| 3 | Control | 2.0 Santoflex AW | 1.5 | 200 | 265 |
| 4 | S-96 | 5.0 N,N'-Didyanoethyl derivative of OZO-88* | 0 | 10 | 35 |
| 5 | V-10 | 5.0 N,N'-Tetraisobutyl-p-phenylenediamine | 0 | 50 | 40 |
| 6 | V-22 | 5.0 N-Cyclohexyl-N'-dimethyl-p-phenylenediamine | 0 | 0 | 0 |
| 7 | V-23 | do | 1.5 | 10 | 0 |
| 8 | V-24 | 5.0 N-Dimethyl-N'-2-octyl-p-phenylenediamine | 0 | 0 | 0 |
| 9 | V-25 | do | 1.5 | 0 | 0 |
| 10 | V-32 | 5.0 N-Phenyl-N'-dimethyl-p-phenylenediamine | 0 | 35 | 40 |
| 11 | V-33 | do | 1.5 | 65 | 60 |
| 12 | T-13 | 5.0 Dicyanoethylation derivative of N,N'-di-2-butyl-p-phenylenediamine | 0 | 15 | 0 |
| 13 | F-25 | 5.0 Monocyanoethylation derivative of N,N'-di-2-butyl-p-phenylenediamine | 1.0 | 20 | |
| 14 | F-26 | 5.0 Monocyanoethylation derivative of N,N'-di-2-butyl-p-phenylenediamine plus 2.0 pts. monocyanoethyltetraethylenepentamine. | 2.0 | 0 | |

*OZO-88 is N,N'-Di-2-octyl-p-phenylenediamine.

Table II

OZONE RESISTANCE OF ELASTOMER COMPOUNDS (OTHER THAN GR-S 1500) CONTAINING ANTIOZONANTS OF TABLE A HEREIN (NATURAL RUBBER CONTAINED 1 PT. PBNA; NEOPRENE CONTAINED 2 PTS. NEOZONE A; NITRILE RUBBER CONTAINED 1.5 PTS. BLE-25) DYNAMIC OZONE EXPOSURE TEST; 40° C.; 50±5 P.P.H.M. OZONE; 30 FLEXURES PER MINUTE

| Example | Elastomer | Sample No. | Pts. Additives | Pts. Wax | "A Value" Crack Depth (microns) | |
|---|---|---|---|---|---|---|
| | | | | | Unaged | Aged 24 hrs. at 100° C. |
| Group E: | | | | | | |
| 1 | Natural Rubber | Control | 5.0 Santoflex AW | 0 | 50 | 200 |
| 2 | do | Q-94 | 5.0 Reaction product of SnO (0.05 mole); penta(cyanoethyl-di-ethylenetriamine (0.1 mole); N,N'-di-(1-ethyl-3-methyl-pentyl)-p-phenylenediamine (0.13 mole); and AgeRite Resin D (0.12 mole). | 0 | 10 | 115 |
| Group F: | | | | | | |
| 1 | Neoprene | Control | None | 0 | 280 | 340 |
| 2 | do | R-53 | 5.0 Monocyanoethyl derivative of OZO-88** | 0 | 25 | 65 |
| 3 | do | R-54 | do | 1.5 | 0 | 0 |
| 4 | do | R-74 | 5.0 N-(2-Nonadecyl)-p-phenylenediamine | 1.5 | 50 | 35 |
| 5 | Nitrile Rubber Hycar 1014. | S-3 | 5.0 N-Butyl-N'-2-tridecyl-p-phenylenediamine+ 1.5 BLE-25. | 0 | 140 | 300 |
| Group G: | | | | | | |
| 1 | Hycar 1014 | Control | 1.5 BLE-25 | 1.5 | 700 | 600 |
| 2 | do | T-81 | 5.0 Monocyanoethyl-N,N'-di-2-octyl-p-phenylenediamine* | 0 | 0 | 75 |
| 3 | Butyl | Control | None | 0 | 130 | 100 |
| 4 | do | Z-2 | 5.0 N,N'-Di-2-octyl-N-methyl-p-phenylenediamine | 0 | 0 | 0 |
| 5 | do | V-56 | 5.0 N,N'-Dimethyl-N'-cyclohexyl-p-phenylenediamine | 0 | 0 | 0 |
| 6 | do | V-57 | 5.0 N,N-Dimethyl-N'-Phenyl-p-phenylenediamine | 0 | 0 | 0 |
| 7 | do | V-63 | 5.0 N-Monocyanoethyl-N,N'-di-sec-octyl-p-phenylene-diamine. | 0 | 80 | |

*The cyanoalkyl and aryl derivatives of the various p-phenylenediamines of this invention are very effective antiozonants for the "nitrile" typ elastomers.
**See Table I footnote.

FURTHER DISCUSSION OF RESULTS

Part I of this invention disclosed new antiozonants which per se in rubber containing insignificant amounts of antioxidants can protect elastomers against ozone cracking. Part II disclosed synergistic combinations of the antiozonants of Part I with antioxidants and/or waxes.

I have found that the quantity of antioxidant required to obtain the synergism varies with the antioxidants used. Most of the synergistic combinations of antiozonants of Part I of this invention in combination with antioxidants such as those examples of Table C contained at least one part PBNA (added at the GR-S polymerization plants) in addition to the added antioxidants.

From the data obtained in dynamic ozone tests it appeared that 11 of the antioxidants of Table C used only in 2 pts. per 100 pts. elastomer in combination with less than 3 pts. antiozonants of Table A per 100 pts. elastomer do not quite attain effective protection in GR-S 1500 compounds, viz:

BLE-25  
Diphenylamine  
PBNA  
Rosinamine D  
Flectol H  
1-naphthylamine  
Antioxidant 2246  
Dipropylene glycol monosalicylate ester  
Neozone A  
Parazone  
Polygard which are chemically identified in Table C above.

But it was noted from additional data that these 11 less actively synergistic antioxidants, when augmented by the 1.25 pts. of antioxidant present in commercial GR-S, did give effective synergistic protection of the elastomer with 3 pts. or less of antiozonant similar to the examples of FIGURE 2.

It is accordingly shown that to attain good synergistic activity with those less actively synergistic antioxidants, it is necessary to employ increased quantities thereof, or some other synergist therewith.

With respect to the antiozonants of this invention, the comment as regards the insignificance of less than 1.5 parts total of antioxidants (that show significant synergism when used in greater than such amount) apply. The fact that paraffin wax alone is a better synergist than microcrystalline wax has also been demonstrated. The data obtained with antiozonants of the present invention show the effectiveness of the antiozonant per se, and the synergism therewith of waxes. (See FIGURES 3 and 4.) In this connection, it will be noted that (1) the effectiveness of wax as a synergist is developed to a major extent at a wax content of about 1.5 pts. wax with varying amounts of the antiozonant and (2) the improvements in the aged samples from the inclusion of wax with the antiozonant generally parallel those in the unaged samples.

It has been further demonstrated that the beneficial effect of wax in outdoor static tests is obtained. Thus in static usages even in the absence of synergistic antioxidants, the time to first cracking of GR-S samples containing 2.5 pts. of antiozonants of the five categories of Table A can be doubled by inclusion of 1.5 pts. wax.

The categories of antiozonants of the present invention (Table A) are represented by formula

RNA—R'—NBR'' wherein R' is an arylene radical selected from the group comprising phenylene and diphenylene radicals and hydrocarbon substituted phenylene and diphenylene radicals, R is a radical selected from the group comprising alkyl and cycloalkyl according to the categories I to V; either one of A or B may be hydrogen, $C_1$–$C_4$ alkyl, cyanoalkyl or nitroso, and A may also be an acyl group; the other of A or B may be $C_2$–$C_4$ alkyl, cyanoalkyl or nitroso according to Table A; R'' is a radical selected from the group comprising (I and IV) sec-alkyl, (II and V) aryl and hydrocarbon substituted aryl, and (III) cycloalkyl and hydrocarbon substituted cycloalkyl; and wherein the total number of carbon atoms in the hydrocarbon nucleus plus hydrocarbon substituents for the five categories are (I) 15 to 32, (II) 13 to 31, (III) 16 to 31 and (IV) 12 to 32 and (V) 17 to 31.

In the present invention a third and/or fourth substituent (A or B) may be present (according to Table A) such as $C_1$–$C_4$ alkyl, cyanoalkyl ($C_1$–$C_{19}$), nitroso, or polycyanoalkyl-polyamino alkyl, or acyl radical (examples of Tables I and II). In the case where A is acyl the molecular weight of the acyl radical has not been found to be critical, and good antiozonant activity is evidenced for monoacyl derivatives ranging from $C_3$ to $C_{20}$ or higher; $C_8$ to $C_{18}$ are preferred as the carbon range of the acyl group of said derivative; while these derivatives have other advantages the antiozone activity per unit weight of such weight of such derivatives is lower than for the parent compound, which disadvantage does not apply to other derivatives herein disclosed, e.g., those containing cyano hydrocarbon substituents, etc. It has further been found that A and B may be nitroso, alkyl (one may be $C_1$–$C_4$ and the other $C_2$–$C_4$), or cyanoalkyl ($C_1$–$C_{19}$), etc. Both A and B may not be acyl.

The data also demonstrate the application of the present invention to elastomers other than "hot" and "cold" GR–S. Natural rubber, polybutadiene, butadiene-methylvinylpyridine copolymer, butadiene-styrene-methacrylic acid copolymers and Hycar "N-rubber" have been successfully protected against ozone by synergistic antiozonant compositions of the present invention.

In summarizing the parts of this invention it has been demonstrated that: (1) antiozonants of Table A when used in from 2 to 2.5 parts in 100 parts elastomer protect the elastomer compound against ozone attack; also when A or B is acyl these antiozonants are effective antiozonants per se, when employed in larger quantity (e.g., up to 7.5 parts); (2) when the antiozonants of (1) are combined with appropriate quantities of antioxidants of the several classes of antioxidants and/or waxes, syngeristic antiozonant compositions are formed wherein reduced amounts of antiozonants will serve to protect elastomer compositions.

The appropriate incorporation of the new antiozonant compositions, i.e., combinations of the substituted phenylenediamines with amino antioxidants, and/or waxes (and/or metal salts such as certain metal fatty acid salts of said copending joint application) gives virtual immunity against much higher than ordinary atmospheric concentrations of ozone, to elastomer compositions, even when the same have been subjected to radical heat-aging, thus showing that these antiozonant combinations are capable of protecting the products for long periods of time under dynamic as well as static conditions and at elevated temperatures.

The invention has further shown that when the total carbons of the compounds are kept within designated ranges the antiozonants are highly effective in aged stocks, it being thus shown that the ranges are critical for the protection of products subjected to high temperatures resulting from dynamic usage or otherwise, but may be broadened to some extent (e.g., a carbon count of say eight carbons less than the heat-aged ranges) and still be suitable for protection of static goods not subject to elevated temperatures or dynamic usages.

Comparison of the results attained, mutually and with the controls, shows that various synthetic elastomers are protected against ozone by incorporation of three to five parts of the antiozonants therein; and the same considerations show that natural rubber is similarly protected, as well as polyisoprenes prepared synthetically by emulsion polymerization processes, by alkali metal polymerization (e.g., Coral rubber of Firestone Tire & Rubber Co.), by organo-metal alkali catalysts (e.g., the Alfin type of catalyst) or by metal alkyl catalysts (e.g., aluminum trialkyl, lead tetraethyl and combinations of organometallic compounds with metal salts).

In addition to the examples given in the tables copolymers of styrene and butadiene were prepared which contained small amounts of copolymerized carbonyl-containing monomers such as methylvinyl ketone, crotonaldehyde or methylisopropenyl ketone and compounded with the antiozonants of this invention, and the results showed that these antiozonants are useful as additives for these carbonyl containing elastomers.

These and other elastomers may be employed as additives, e.g., plasticizers for plastomer products, for which polar elastomers are usually selected. In such cases ozone deterioration of the elastomer component is prevented by the antiozonants of this invention.

The samples shown in the tables cover the principal types of elastomers, above described, but the range of polymers and combinations protected against ozone attack by the present antiozonants is not limited thereto, as similar protection has been obtained with plastomer compositions containing elastomers (e.g., butyl rubber, neoprene, polybutadiene, GR–S, acrylonitrile rubbers, etc.), which per se show less susceptibility to ozone attack.

Butyl rubber is known to be less susceptible to ozone attack than are GR–S elastomers. However, ozone cracking of butyl vulcanizates is an industrial problem for certain uses as evidenced by the study of D. C. Edwards and E. B. Storey, Transactions of the Institution of the Rubber Industry, pp. 45–69, vol. 31, No. 2, April 1955. I have found butyl rubber when plasticized with oils as commercially practiced to be considerably attacked by ozone and have demonstrated that the antiozonants and synergistic antiozonant compositions of the present invention when appropriately compounded into butyl rubber are capable of protecting the resultant butyl vulcanizates against ozone attack. In like manner plasticized neoprene compounds are protected against ozone attack by appropriate use of antiozonants and antiozonant compositions of the present invention.

As also noted above, the elastomers used in the examples of the tables herein generally contained antioxidant material capable of withstanding vulcanization, usually PBNA, but sometimes BLE (chemically identified in Table C above). Such antioxidant materials afford no protection against ozone attack of the principal products, nor do they effectively enable the other antioxidants of Table C to do so. From the observed data, however, it is shown that in combination with the new antiozonants, the PBNA and other specific antioxidant materials have a synergistic effect enabling smaller quantities of the antiozonants of the present and the other specified inventions to effectively protect the products against ozone attack.

Variations in compounding of the elastomers can nullify the protective action of these antiozonants. For example, high amounts of waxes, plasticizers, zinc stearate, rosin acids or stearic acid lower the effectiveness of our new additives in rubbers. Caution should be exercised by the compounder to avoid excessive amounts of such ingredients particularly where the elastomer is subjected to dynamic use.

In general from 1 to 5 pts. of the new diamine antiozonant per 100 of rubber in the absence of added antioxidants is adequate for practice of the present invention in protection of statically employed items (prepared from natural and synthetic rubbers) for practical periods of time against deterioration due to ozone attack; 3 or more parts are preferred for elastomer items in dynamic usages. In synergistic combinations, however, from 0.5 to 3 pts. of the substituted p-phenylenediamines, substituted benzidines, substituted bis(aminophenyl)amines, and substituted bis(4-aminophenyl)methanes of this invention are sufficient to provide ozone protection for the elastomer compounds for both static and dynamic usage. When either of A or B (of R NAR′NBR″) is acyl as much as 7.5 pts. antiozonant/100 pts. elastomer are preferred for dynamic protection.

The amount of antiozonant compositions containing synergistic antioxidants and/or waxes required to give ozone protection to elastomers varies with the type of antioxidants and metal salts (part III of said copending joint invention) employed and depends on whether the antioxidants and metal salts are used in combination or singly; in general for the practice of the present invention the total amount of synergistic additives varies from 1.25 to 6 pts. per hundred of elastomer. The use of small amounts of waxes in rubber compounds together with antioxidants of course is recognized in the prior art. However, the appropriate combination of waxes with the antiozonants of the present invention, both with and without synergistic antiozonants to develop synergistic antiozonant compositions, constitutes an unforeseeable and a valuable advance in the protection of elastomer and plastomer compositions against ozone cracking, in view of the fact that waxes were heretofore considered to be harmful for ozone resistance of elastomers in dynamic usage.

The antiozonants and synergistic antiozonant compositions of the present invention have also been found to be effective in protection against ozone cracking of plastomers which have residual unsaturation or active hydrogens such as may be present in methylene or methinyl groups. Thus resins or plastomer compositions comprising polymers and copolymers of vinylchloride, vinylacetate, alkylacrylates, etc., in combination with unsaturated polymer ingredients, are subject to attack by ozone, and such attack is avoided when the new antiozonants are present in such compositions.

It has further been demonstrated that the new antiozonants and synergistic antiozonant compositions can be compounded with the GR-S 1500 in the Banbury mixer, on the rubber mill, or by incorporation in the elastomer latices as above described either at the polymer plant or by the consumer at any time prior to coagulation and drying.

Also the substituted diamine antiozonants can be added as the monostearamide, oleamide, or other fatty acid amide, as evidenced by experiments wherein fatty acid-antiozonant mixtures (1 mole acid/1 mole diamine) were compared with the mono-acid amide in GR-S compounds and equivalent ozone protection was afforded in the two cases (Examples A-2 and -3, Table I). The N - nitroso - derivative of N,N'-di-2-octyl-p-phenylenediamine also serves equally well as the N,N'-di-2-octyl-p-phenylenediamine for ozone protection (Examples A-1 and -4). Cyanoalkyl substituents (A and/or B) also result in effective diamine derivative antiozonants, e.g., N,N'-di-sec-butyl or di-sec-octyl-p-phenylenediamine reacted with one or two moles of lactonitrile (Examples D-1, -4, -12, -13, -14, G-2, -7). Examples of A and/or B as alkyl are C-6, -9, D-5 to -11, and G-4 to -6.

The research has shown that the new compounds are valuable antiozonants for plastomers and resins as well as for natural and synthetic rubbers and are particularly useful antiozonants for tires and similar natural and synthetic products (subject to ozone attack) which attain high operating temperatures, such as those temperatures attained by heavy duty truck tires, and such temperatures may even rise to 300° F. in use. Antiozonants are herein defined as additive agents which protect the polymeric material, e.g., natural and synthetic rubbers, against deterioration due to ozone attack. While serving as antiozonants the new compositions also serve as antioxidants, i.e., the new products of this invention protect against deterioration of tensile properties of rubber compounds due to attack by oxygen and sunlight. However, the antiozonants must not be too reactive with oxygen or they can too rapidly disappear from the compounds incorporating them and ozone protection will thereafter be absent. Similar to the said copending sole and joint applications, the present classes of compounds represented by $$R-\overset{A}{N}-R'-\overset{B}{N}-R''$$

as well as each synergistic composition described herein is specific and differs in general from other amines such as diarylamines, arylenediamines, and their derivatives, and mixtures with other types of antioxidants in that other members of these general categories and their mixtures will not effectively protect against attack by ozone as is demonstrated by the research summarized hereinbefore.

These new antiozonant compositions have also been found effective in protection of elastomer dispersions such as latices of natural rubber, GR–S elastomers, neoprene, acrylonitrile copolymeric elastomers, and the like which are to be used for coating and film-forming purposes, e.g., for paper coatings, wall paints, etc. By incorporation of the new antiozonant compositions in the latices together with the vulcanizing ingredients, the subsequently formed cured films therefrom are effectively protected against ozone cracking.

An "antiozonant composition" as used herein denotes any of the amine antiozonants represented by $$R-NA-R'-NB-R''$$

as herein defined, as well as each and every synergistic composition described in the preceding discussion whether containing one or more of each class of synergists described, i.e., waxes, certain metal salts, and the designated classes of antioxidants.

Herein the term elastomer is employed to designate an elastic polymer or macromolecule, whether a naturally-occurring material or a synthetic polymeric substance. Plastomer is defined as including both thermoset and thermoplastic high-molecular weight resinous and plastic materials. These definitions follow those used by Harry L. Fischer, Industrial and Engineering Chemistry, vol. 31, p. 942 (1939).

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and all modifications that come within the meaning and range of equivalency of the claims are intended to be included therein.

I claim:

1. A sulfur vulcanizable rubber normally subject to cracking containing, in sufficient amount to retard said cracking, a substituted p-phenylene diamine selected from the group consisting of the tetra- substituted p-phenylene diamines having the formulae:

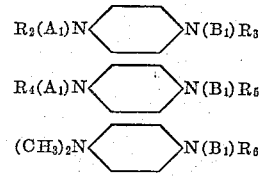

wherein $A_1$ and $B_1$ are cyanohydrocarbon radicals containing from 1 to 19 carbon atoms, $R_2$ is an alkyl radical containing from 3 to 9 carbon atoms, $R_3$ is a radical selected from the group consisting of cyclohexyl radical, phenyl radical, and secondary alkyl radicals containing from 3 to 9 carbon atoms, $R_4$ and $R_5$ are radicals selected from the group consisting of cycloalkyl and alkyl substituted cycloalkyl radicals containing from 3 to 9 carbon atoms, and $R_6$ is a secondary alkyl radical containing from 8 to 9 carbon atoms.

2. A sulfur vulcanizable rubber composition according to claim 1, in which the substituted p-phenylene diamine has the formula

3. A sulfur vulcanizable rubber composition according to claim 1, in which the substituted p-phenylene diamine has the formula

4. A sulfur vulcanizable rubber composition according to claim 1, in which the substituted p-phenylene diamine has the formula

5. A sulfur vulcanizable rubber composition according to claim 1, which contains, in sufficient quantity to increase the anti-cracking effectiveness of said substituted p-phenylene diamine, material selected from the class consisting of group (a) 6-ethoxy-2,2,4-trimethyl-1, 2-dihydroquinoline, 2,2,4-trimethyl-1,2-dihydroquinoline polymer, diphenylamine-acetone condensation product, phenyl-beta-naphthylamine, phenyl-alpha-napthylamine, aniline-acetone reaction product, aniline-butyraldehyde reaction product, di-alpha-naphthylamine, di-beta-naphthylamine, phenylenediamine (ortho, meta, and para forms), p,p'-diaminodiphenylmethane, p-amino-diphenylamine, 1,2-di-anilino-ethane (diphenylethylenediamine), o-tolidine, N,N'-diphenyl-p-phenylenediamine, naphthylenediamine, di-p-methoxydiphenylamine, N,N'-di-sec-butyl-p-phenylenediamine, N,N'-di-beta-naphthyl-p-phenylenediaimne, N,N' - di - beta-ac-tetrahydronaphthyl-p-phenylenediamine, N,N' - di-alpha-naphthyl-p-phenylenediamine, tetraethylenepentaminopropionitrile, mixture of isopropoxydiphenylamine, diphenylphenylenediamine and phenyl-beta-naphthylamine, dehydroabietylamine (Rosinamine D), dodecylamine-1, N,N'-tetramethyl-p,p'-di(aminophenyl) methane, N-dimethyl-p-phenylenediamine, the cyanoalkylamines which contain at least one cyano group and at least one amino group and have a total carbon count per molecule of from 2 to 30 carbon atoms, p-phenylphenol, 2,5-di-tert-butyl hydroquinone, hydroquinone, p,p'-bisphenol, dibutyl-phenol sulfide, triphenyl phosphite, tri(nonylphenyl) phosphite, glycerol monosalicylate ester, dipropylene glycol monosalicylate ester, thioacetanilide, thiocarbanilide, thioacetamide, dibenzylthiourea, phenylacetothiomorpholide, and group (b) the paraffin and microcrystalline waxes, and mixtures of the foregoing.

References Cited by the Examiner

UNITED STATES PATENTS

| 2,798,860 | 7/57 | Hand et al. | 260—45.9 XR |
| 2,883,362 | 4/59 | Rosenwald et al. | 260—45.9 |

FOREIGN PATENTS

| 161,552 | 3/55 | Australia. |
| 508,129 | 6/39 | Great Britain. |
| 728,509 | 4/55 | Great Britain. |

OTHER REFERENCES

Shaw et al.: "Antioxidants for GR–S Rubber," Rubber World, August 1954, pp. 636–642.

MORRIS LIEBMAN, *Primary Examiner.*

PHILIP E. MANGAN, MILTON STERMAN, ALLAN M. BOETTCHER, ALPHONSO D. SULLIVAN,
*Examiners.*